Sept. 6, 1955  C. A. TEA  2,716,883
TESTING MACHINE FOR SHOCK ABSORBER OR THE LIKE
Filed June 25, 1952
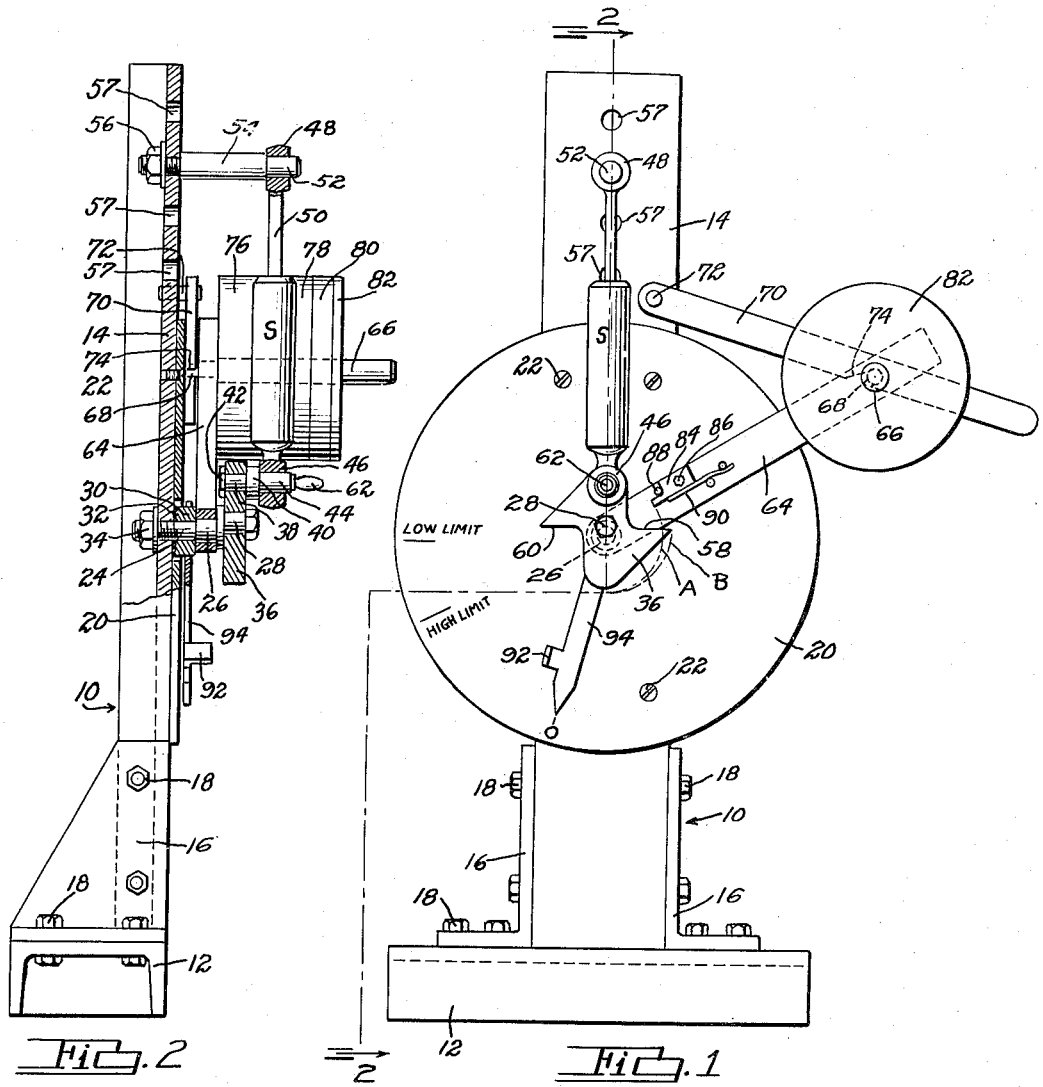
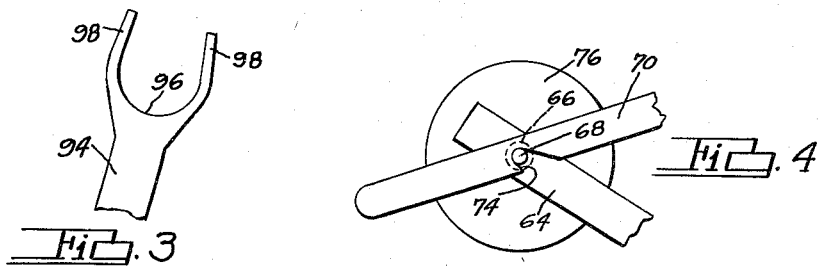
INVENTOR.
CLARK A. TEA
BY
HIS ATTORNEY United States Patent Office 2,716,883
Patented Sept. 6, 1955

2,716,883

TESTING MACHINE FOR SHOCK ABSORBER OR THE LIKE

Clark A. Tea, Southfield Township, Mich.

Application June 25, 1952, Serial No. 295,484

5 Claims. (Cl. 73—11)

This invention relates to a testing machine and more particularly to a testing machine for shock absorbers and the like for determining the rebound and compression qualities of the shock absorber.

The action of a shock absorber is a resistance to tension and compression forces produced by relative movable parts connected respectively to the shock absorber.

The shock absorber is originally designed to have a predetermined resistance to tension or rebound forces and a different resistance to compression forces. Due to inaccuracies in manufacture or wear of the parts, the resistance to rebound or compression departs from the intended setting, either too stiff or too weak. It is therefore desirable to check the action of the shock absorber to determine to what extent the rebound or compression resistance is in error so that either may be adjusted to give the proper results.

It is an object of the present invention to provide a device adapted to receive the shock absorber which will operate to move the working parts of the shock absorber as under its normal operating conditions and to indicate the action of the rebound and compression resistance.

It is another object of the invention to provide an inexpensive device to which the shock absorber may be readily attached and one which is easily operated.

A further object of the invention is to provide a swinging weight, which during its initial swinging movement operates the shock absorber. After the shock absorber has been extended to a predetermined length, for rebound test or compressed for compression test the weight is released and it travels through the remainder of its swinging movement by its own inertia, moving an indicator to the limit of the swinging movement of the weight.

Other objects and advantages of the invention will more fully appear from the following description taken in connection with the accompanying drawings, in which:

Fig. 1 is a front elevational view of the machine illustrating a shock absorber in position for testing;

Fig. 2 is a cross sectional view taken on line 2—2 of Fig. 1, parts thereof shown in elevation;

Fig. 3 is a fragmentary side view of one end of the indicator, showing the means for frictionally supporting it on the machine for rotation over the fixed dial; and Fig. 4 is a back side view of the weights, the weight supporting arm, and the weight arm latch.

Referring to the drawings, I have shown a supporting frame 10 having an inverted channel base 12, a vertical channel 14, and angular brace members 16 secured to the base 12 and to the opposite side faces of the vertical channel 14 by bolts 18.

A dial 20 is secured to the outer face of the vertical channel 14 by screws 22. A crank shaft 24, having an arm supporting bearing portion 26 and an eccentric cam supporting bearing portion 28, is extended through a bushing 30, the dial 20 and the vertical channel 14. The bushing 30 is provided with a serrated face 32 for engagement with the front face of the vertical channel 14 and a nut 34 screw threaded to the end of the shaft 24 draws the shaft 24 and bushing 30 into non-rotatable relation to the frame 10.

A double faced ratchet 36 is rotatably mounted on the bearing 28 and is provided with an opening 38 radially spaced from the axis of the bearing 28. A forwardly projecting pin 40 is received in the opening 38 and rigidly secured to the ratchet 36 by a nut 42. The pin 40 is provided with a bearing portion 44, which receives an eye 46 of the shock absorber S. The opposite end of the shock absorber is provided with another eye 48, shown here as on the piston rod 50. The eye 48 slidingly fits a bearing portion 52 of a forwardly extending pin 54 which is bolted to the channel 14 of the frame 10 by a nut 56. A plurality of vertically spaced openings 57 are provided for receiving the pin 54 so that a selection may be made in the distance between bearings 52 and 44.

The ratchet 36 is provided with oppositely disposed, and radially extending striking faces 58 and 60. The striking face 58 is referred to as the rebound testing face and the face 60 is referred to as the compression testing face. A handle 62 is received on the outer end of the pin 40 for manually rotating the cam 36 about the eccentric axis 28 of the crank shaft 24. The handle 62 is smaller in diameter than the opening through the shock absorber eye 46 so that the latter may be readily slid over the handle on to the bearing 44 when assemblying a shock absorber in position on the machine for testing.

A weight arm 64 is pivotally supported on the bearing 26 of the fixed shaft 24 and carries, at its outer free end, a forwardly extending pin 66. The pin 66 is secured to the arm 64, either by screw thread engagement or press fit, and carries a rearwardly projecting pin 68 for releasable engagement with a swinging arm 70, pivoted to the channel 14 by pin 72. The arm 70 is provided with a notch 74 in its lower edge into which the pin 68 enters when the weight arm 64 is raised upwardly in contact with the arm 70. This notch 74 is formed as a hook in its lower surface so that the arm 70 retains the weight arm 64 in a partially raised position, but when the arm 70 is raised the pin 68 slides out of the notch 74, permitting the weight arm 64 to fall.

The weight is herein shown as annular discs of variable weight which are slid over the end of the pin 66. These weights are shown in Fig. 2 as 76, a twenty pound weight, 78 a ten pound weight, 80 a five pound weight, and 82 a two and one-half pound weight. By selecting the proper number of weights, the operator may use practically any predetermined weight desired, depending upon the force required to test a particular shock absorber.

The weight arm 64 is further provided with a dog 84 which is pivoted to the arm 64 at 86 and a stop pin 88 limits the swinging movement of the dog in its upward movement. A spring 90 resiliently holds the dog against the stop 88. The free swinging end of the dog 84 is in a path for striking engagement with the face 58 of the ratchet 36. The arm 64 and dog 84 swing in a path indicated by the dot and dash line A and the ratchet 36 rotates in a path indicated by the dot and dash line B.

When the weight is raised to its latched position as indicated on the drawing, the arm 70 is raised until the pin 68 slides out of the notch 74. The weight arm 64 then swings in an arc about the bearing 26 and the dog 84 rotates the ratchet 36, elongating the shock absorber. As will be seen by the lines A and B, the dog slides outwardly on the face 58 during rotation of the weight arm 64 and ratchet 36 and at the bottom of the swing, the dog is disengaged from the face 58 and the weight arm 64 swings freely by its own inertia in a clockwise direction. The weight arm 64 then engages a projection 92 on a pointer 94 carrying the pointer with the weight arm to the limit of the swing of the weight arm.

The size of the weight and the speed with which the weight travels determines the inertia of the weight and the position at which the weight will come to rest in its upward swing. Thus, if the shock absorber is stiff, the weight moves slowly and when released from the resistance of the cam, will only swing a short distance. However, if the shock absorber is weak the weight moves rapidly and when released from the ratchet will swing a greater distance upwardly.

The dial 20 may be graduated in many different ways for indicating the travel of the weight arm and pointer. I have shown a zero marking where the pointer is placed before a test is made; a high limit marking indicating the maximum permissible stiffness of the shock absorber; and a low limit marking indicating the maximum freeness permissible in the shock absorber.

The pointer 94 is rotatable on the bushing 30 and is provided with semi-circular bearing portion 96 and outwardly extending end portions 98 which are spaced apart a distance less than the diameter of the bushing 30 so that when assembled the end portions resiliently grip the bushing 30 to provide frictional resistance.

When it is desired to test a shock absorber for its rebound resistance, the shock absorber is placed over the bearings 52 and 44 with the ratchet 36, weight arm 64 and pointer 94 in the positions shown on the drawing. The arm 70 is then raised until the pin 68 slides out of the notch 74, permitting the weight arm 64 to swing by gravity in a clockwise direction. The dog 84 then strikes the ratchet face 58, rotating the ratchet 36 about its bearing 28 and extending the shock absorber. The ratchet 36 is rotated by the weight until the dog 84 slides off of the ratchet face 58, which is at the bottom of the swing and fully extended position of the shock absorber. As above referred to, the resistance of the shock absorber determines the speed of weight travel and consequently its inertia. Therefore, when the dog 84 leaves the ratchet face 58 the swinging weight is no longer resisted by the shock absorber and the weight arm 64 continues to swing freely, striking the projection 92 and moving the pointer 94 to the maximum swing of the weight arm. The pointer remains in its maximum moved position due to its frictional tension on the bushing 30 and the weight arm then freely swings as a pendulum until it comes to rest. The test may be repeated by manually raising the weight arm 64 into contact with the arm 70 until the notch 74 engages the pin 68, holding the weight in raised position.

If it is desired to test the compression resistance of the shock absorber, the ratchet is rotated by the operator through an arc of 180 degrees, placing the ratchet surface 60 in position for contact by the dog 84, the latter permitting the ratchet to pass by the pivotal movement of the dog at 86 against the spring 90. The shock absorber is now fully extended and the falling of the weight arm 64, as above described, compresses the shock absorber and the pointer 94 is carried to its position indicating the maximum swing of the weight arm 64.

Thus, it will be seen that I have provided a device which will produce an indication of the shock absorber resistance in either rebound or compression action and one in which the shock absorber need not be removed from the device for testing either.

While I have herein shown and described a preferred embodiment of the invention, it will be understood that various changes including the size, shape and arrangement of parts may be made without departing from the spirit of my invention and it is not my intention to limit its scope other than by the terms of the appended claims.

I claim:

1. A testing machine for a shock absorber or the like comprising, a frame, an arm pivotally mounted on said frame, a weight on said arm at one side of the pivot of said arm, a ratchet having a contact face pivotally carried by said frame on an axis eccentric to the pivot axis of said arm, a support carried by said ratchet and eccentric to the pivot of the contact face for pivotally receiving one portion of the shock absorber, a support carried by said frame for pivotally receiving another portion of the shock absorber, means carried by said arm and in the path of said contact face for engagement with the contact face of said ratchet during only a limited portion of the downward swinging movement of said arm and released from such engagement at the end of the downward swinging movement, and means for indicating the maximum free swinging movement of said arm after the limited portion of the swinging movement of said arm.

2. A testing machine for a shock absorber or the like comprising a frame, an indicator dial carried by said frame, an arm pivotally mounted on said frame for swinging movement across the face of said dial, a pointer pivotally movable across the face of said dial, a ratchet pivotally carried by said frame on an axis eccentric to the pivot axis of said arm, a bearing support carried by said ratchet for pivotally receiving one end of the shock absorber, a bearing support carried by said frame for pivotally receiving an opposite end of the shock absorber, means carried by said arm for engaging a contact face of said ratchet during only a portion of the downward swinging movement of said arm and released from such engagement at the end of the downward swinging movement, and means cooperating between said arm and said pointer for imparting the swinging movement of said arm in only one direction of rotation to said pointer.

3. A testing machine for shock absorbers or the like comprising, a frame, an arm pivotally mounted on said frame, a weight on said arm at one side of the pivot of said arm, a ratchet pivotally mounted on an axis parallel to and eccentric to the pivot axis of said arm, said ratchet having two circumferentially spaced contact faces, a support carried by said ratchet between the contact faces for receiving one portion of the shock absorber, said support being eccentric to the pivot for said ratchet, a support carried by said frame for receiving another portion of the shock absorber, means carried by said arm in the path of said surfaces for sliding engagement with either of said contact faces during only a limited portion of the swinging movement of said arm and rotation of said ratchet, said means being released from contact with said surfaces by the eccentricity of the axes of ratchet and said arm, and means for indicating the maximum swing of said arm after it has been released from contact with said surface.

4. A testing machine for a shock absorber or the like comprising, a frame, an arm pivoted to said frame, a weight on said arm whereby said arm may be swung as a pendulum, a member having a contact surface on an axis eccentric to and parallel to the axis of said arm, a contact member constructed and arranged on said arm for engagement with the contact surface of said member only when said arm is swung through a predetermined degree of its arc, a bearing support spaced from the axis of said member and on said member for pivotally receiving one end of the shock absorber, a bearing support on said frame for pivotally receiving the other end of said shock absorber, and means for indicating the inertia swing of said arm after the contact member has been disengaged from contact with the contact surface of said member.

5. A testing machine for a tension device comprising, a frame, an arm pivotally mounted on said frame for swinging movement thereon, a weight on said arm for causing said arm to swing as a pendulum, a member having a contact surface pivoted on said frame eccentric to the pivot of said arm, a support on said frame for one portion of the tension device, a support on said member spaced from the pivot point of said member for another portion of the tension device whereby rotation of said member causes an extension of the tension device, a contact member on said arm in the path of said contact surface for engagement therewith through a portion of the downward swing of said arm whereby said member is turned with said arm about its pivot to cause extension of the tension device, said contact member being so arranged on said arm in relation to said contact surface that the contact member is disengaged from the contact surface as said arm approaches a downward vertical position, said arm being free for swinging movement therebeyond, and means for indicating the maximum swing of said arm.

References Cited in the file of this patent

UNITED STATES PATENTS

| | | |
|---|---|---|
| 1,981,960 | Lewis | Nov. 27, 1934 |
| 2,024,067 | Shanley | Dec. 10, 1935 |
| 2,070,731 | Henning | Feb. 16, 1937 |
| 2,167,429 | Willard | July 25, 1939 |